Patented Sept. 3, 1935

2,013,030

UNITED STATES PATENT OFFICE 2,013,030

PRODUCTION OF ORGANIC FLUORINE COMPOUNDS

William Stansfield Calcott and Anthony Francis Benning, Pennsgrove, N. J., assignors to E. I. du Pont de Nemours & Company, Wilmington, Del., a corporation of Delaware No Drawing. Application September 10, 1932, Serial No. 632,629

31 Claims. (Cl. 260—162)

This invention relates to organic fluorine compounds and a process for the production thereof.

It has previously been proposed to produce organic fluorine compounds by the reaction of fluorine with various organic materials. Such investigations as have been made have shown that this reaction is extremely energetic and generally causes pyrolysis of the organic material, resulting in the formation of carbon, tar or other undesirable carbonaceous decomposition products. Insofar as is known, no fluorination of carbon compounds with elemental fluorine has ever been commercially successful.

It is an object of the present invention to produce organic fluorine compounds. A further object is to provide a new and improved method of fluorinating organic materials. A still further object is to provide a process for introducing elemental fluorine into organic molecules by a reaction which proceeds smoothly and without substantial carbonization or decomposition of the organic material. Another object is to provide a process for the fluorination of carbon compounds with elemental fluorine which may be operated easily and smoothly on a commercial scale. An additional object is the provision of catalysts for the fluorination of organic materials with elemental fluorine. Other objects will appear hereinafter.

These objects are accomplished according to this invention whereby organic fluorine compounds are produced by reacting organic materials with fluorine in a liquid medium which is substantially inert to fluorine. The reaction may be effected with or without the use of catalysts.

While the invention is susceptible of considerable variation and modification in the manner of its practical application, particularly as regards the nature and proportions of the reactants, the temperature, pressure and exact method of procedure, the following examples, in which the parts are by weight, will serve to illustrate how the invention may be practiced.

Example I

Five parts of benzene were mixed with about 71 parts of anhydrous hydrofluoric acid in a copper vessel provided with an inlet tube of copper extending below the surface of the liquid. This vessel was also provided with a reflux condenser maintained at a temperature of about —70° C., to return vaporized acid and serve as an outlet for excess fluorine.

The fluorine was passed into the inlet tube at room temperature until about 5 parts had been absorbed, the temperature being maintained at about —70° C. The resultant product was run into a platinum vessel and the hydrofluoric acid allowed to evaporate. The residue was neutralized by addition of a dilute solution of sodium hydroxide and the whole extracted with diethyl ether. The ether was evaporated leaving the desired crude product which contained an organic liquid having a fluorine content of about 45% by weight.

Example II

In an apparatus similar in principle to that described in Example I, 5 parts of naphthalene were mixed with 178 parts of anhydrous hydrofluoric acid and fluorinated with about 10 parts of fluorine at a temperature of about 0° C. The reflux condenser was maintained at about 70° to about 80° C. The fluorinated product, which was greyish white, was isolated by evaporation of the solvent hydrofluoric acid and washing the residue with a dilute caustic solution and water. The product analyzed 18% fluorine.

Example III

Five parts of anthracene were mixed with about 142 parts of anhydrous hydrofluoric acid and fluorinated with about 15 parts of fluorine at a temperature of about 20° C. The reaction vessel was equipped with a reflux condenser maintained at a temperature of about 70° to about 80° C. The resultant solution was evaporated to dryness and the residue extracted with acetone. An organic compound containing about 16% fluorine was recovered from the acetone.

Example IV

Ten parts of a saturated aliphatic hydrocarbon oil (B. P. about 150°–250° C.) was mixed with about 107 parts of anhydrous hydrofluoric acid and fluorinated with about 5 parts of fluorine at 0° C., the reaction vessel being provided with a reflux condenser maintained at a temperature of about 70° to about 80° C. The product was isolated by evaporating the hydrofluoric acid, then neutralizing the resultant product with a dilute solution of sodium hydroxide and washing with water. The product obtained by this procedure was a dark liquid containing organic compounds having a fluorine content of about 15%.

Example V

Five parts of chloro-benzene in 107 parts of anhydrous hydrofluoric acid was treated with about 5 parts of fluorine at a temperature of about −30° C. The resultant solution was run into a platinum vessel and the solvent acid allowed to evaporate. The residue was neutralized by the addition of a dilute caustic solution and the whole extracted with diethyl ether. The ether was evaporated leaving a powdery product containing organic fluorine compounds having a fluorine content as high as 22%.

*Example VI*

Five parts of o-dichloro-benzene in 71 parts of anhydrous hydrofluoric acid were treated with about 5 parts of fluorine at a temperature of about −30° C. Hydrofluoric acid was removed from the resultant product by evaporation, the residue neutralized by the addition of a dilute caustic solution, and the whole extracted with diethyl ether. The ether was evaporated leaving a product containing about 20% fluorine.

*Example VII*

Twenty-five parts of hexachlorethane and 71 parts of anhydrous hydrofluoric acid were run into a copper vessel provided with an inlet tube of copper extending below the surface of the liquid. This vessel was provided with a reflux condenser, such as described in Example I, maintained at a temperature of about −30° C. and an additional condenser connected to the outlet of the reflux condenser and maintained at a temperature of about −80° C.

About 25 parts of fluorine gas was passed into the inlet tube, the temperature of the reaction being maintained at about −30° C. Gaseous fluorinated products, evolved from the reaction liquid, were collected in a receiver placed at the outlet of the second condenser. Mixed chloro-fluoro-ethanes were obtained by this process.

*Example VIII*

Twenty-five parts of tetrachlorethylene were mixed with about 71 parts of anhydrous hydrofluoric acid and fluorinated with about 25 parts of fluorine gas at a temperature of about −40° C. in an apparatus similar to that described in Example VII. The fluorinated product evolved from the reaction liquid and collected in the receiver at the outlet of the second condenser contained chloro-fluoro-ethanes.

*Example IX*

In an apparatus such as described in Example VII, 25 parts of tetrachlorethane were mixed with about 71 parts of anhydrous hydrofluoric acid and fluorinated with about 25 parts of fluorine gas at a temperature of about −40° C. The resultant product contained chloro-fluoro-ethanes.

*Example X*

In an apparatus similar in principle to that described in Example I, 5 parts of anhydrous acetic acid were dissolved in about 71 parts of anhydrous hydrofluoric acid and treated with about 5 parts of fluorine gas at a temperature of about −40° C. The resultant reaction liquid was run into a platinum vessel and the solvent acid allowed to evaporate. The residue was neutralized by the addition of dilute caustic and the whole extracted with diethyl ether. The ether was evaporated leaving the desired crude product which contained organic fluorine compounds having a fluorine content as high as 18% by weight.

*Example XI*

Five parts of brombenzene were mixed with about 107 parts of anhydrous hydrofluoric acid in an apparatus similar to that described in Example I, and about 5 parts of fluorine gas passed into the resultant solution while maintaining a temperature of about −40° C. The hydrofluoric acid was then evaporated and a liquid organic product similar to that described in Example V and containing about 4% fluorine was isolated by neutralization with caustic and extraction with ether.

*Example XII*

Twenty parts of benzene sulfonic acid were mixed with about 142 parts of anhydrous hydrofluoric acid and fluorinated with about 5 parts of fluorine gas at about −40° C. The hydrofluoric acid was evaporated from the reaction mixture and the residue treated with caustic and extracted with ether to produce an organic product containing 22% fluorine.

*Example XIII*

In an apparatus similar in principle to that described in Example VII, 25 parts of trichlorethylene in about 142 parts of anhydrous hydrofluoric acid were treated with about 25 parts of fluorine gas at a temperature of about −40° C. The vapors evolved from the reaction liquid were condensed by cooling to about −70° C. The condensate contained both saturated and unsaturated fluoro-chloro-ethanes.

*Example XIV*

Twenty-five parts of ethylene chloride were mixed with 171 parts anhydrous hydrofluoric acid and fluorinated with about 25 parts of gaseous fluorine at a temperature of about −40° C. in an apparatus such as that described in Example VII. The product recovered contained aliphatic chloro-fluorides.

*Example XV*

Twenty parts of anthracene were introduced into 200 parts of anhydrous hydrofluoric acid in a copper reaction vessel closed with the exception of a liquid inlet and a vapor outlet line at the top. The inlet consisted of a copper tube extending below the reaction liquid and being connected to a lagged, packed column through a trap which served as a liquid seal to prevent escape of gases from the reaction vessel to the column. The column was connected to a gas holder at its upper end (or open to the atmosphere). Near the bottom of the column an inlet line for fluorine was located. The outlet line on the reaction vessel, referred to above, was connected to a condenser so located that its contents emptied into the column near the top thereof. The reaction vessel was maintained at a temperature of about 20° C. causing the hydrofluoric acid to vaporize and pass upwards through the vapor outlet into the condenser which was maintained at a temperature of about −70° C. to −80° C. The liquid from the condenser then flowed into the column where it cooled to about −20° C. Fluorine in sufficient amount to saturate the liquid in the column was introduced continuously through the fluorine inlet near the base of the column. This was continued for six hours, at the end of which time the products in the reaction vessel were isolated by evaporation of the solvent acid and extraction of the residue with a solvent such as acetone. By this method an organic product containing about 20% fluorine was obtained.

Example XVI

Five parts of benzene were mixed with about 100 parts of fluorsulfonic acid and about five parts of gaseous fluorine passed into the mixture at a temperature of about —40° C. An organic fluorine compound was isolated by drowning the reaction mass in water, and extracting the organic material with diethyl ether.

Example XVII

Twenty parts of hexane were mixed with 100 parts of anhydrous hydrofluoric acid in a closed vessel and fluorine introduced under an absolute pressure of about two atmospheres at a temperature of about —40° C. The fluorinated hexane was isolated by fractionation of the reaction mixture.

Example XVIII

In an apparatus similar in principle to that described in Example VII, 25 parts of hexachlorethane were mixed with 71 parts of anhydrous hydrofluoric acid and 0.4 parts of antimony pentachloride and the resultant product treated with about 25 parts of fluorine at a temperature of about —30° C. Mixed chloro-fluoro-ethanes were produced.

The invention is generally applicable to the fluorination of aliphatic and aromatic carbon compounds. Special mention may be made of the application of the invention to the treatment of the following compounds: benzene, toluene, zylenes (o, m, and p), naphthalene, anthracene, chlorobenzene, dichlorobenzenes, trichlorobenzenes, tetrachlorobenzenes, pentachlorobenzene, hexachlorobenzene, tetrachlorethylene, tetrachloroethane, hexachloroethane, ethylene chloride, trichlorethylene, ethyl benzene, ethyl toluenes (o, m and p), brombenzene, iodobenzene, butane, pentane, hexane, ethylene bromide, ethylidene dibromide, ethylidene dichloride, acetic acid, benzene sulfonic acid, dibenzanthrone (violanthrone), 4,4'-dichlorindigo, dimethoxy-dibenzanthrone, benzanthrone, anthraquinone, benzoic acid, flavanthrone (C. I. 1118), Brilliant Yellow No. 10 (C. I. 364), alpha-chloranthraquinone, beta-chlor-anthraquinone, ortho-nitro-chlor-benzene, azobenzene, Vat Yellow G (C. I. 1139), auranthrone, indigo, meta-bromtoluene, the potassium salt of alpha-anthraquinone sulfonic acid, the potassium salt of beta-anthraquinone sulfonic acid, alpha-naphthalene sulfonic acid, beta-naphthalene sulfonic acid, tetra-methyl-diamino-triphenyl-carbinol, Rhoduline Blue 6 G (C. I. 658), pyridine, quinoline, beta-amino-anthraquinone, aniline, 6,6'-dibrom-4,4'-dimethyl-2,2'-bis-thionaph-theneindigo, oleic acid, 3,3'-dibrom-1,2,2',1'-anthraquinone azine, beta-methyl-anthraquinone, alpha-anthracene sulfonic acid, beta-anthracene sulfonic acid, indanthrone, alpha-phenyl-beta-amino-anthraquinone, and anthanthrone.

As previously indicated, the liquid reaction medium should preferably be substantially inert to the reactants, that is to say, should be of such character that it does not give rise to undesirable side reactions or otherwise affect the reaction unfavorably. In general, it is preferable to employ a liquid medium which is a solvent for the organic material treated. It should preferably also be a solvent for fluorine. Mention may be made of the particular suitability of reaction media such as hydrofluoric acid, fluorsulfonic acid and hydrocarbons, which have been fluorinated until inert under the conditions of the reaction, e. g., hexafluorethane. As further examples of reaction media which may be employed may be mentioned fluoro-chloro-hydrocarbons, such as, for example, difluoro-dichloromethane; trifluoro-trichloro-ethane, tetrafluoro-dichloro-ethane, pentafluoro-chloro-ethane and mixtures of trifluoro-trichloro-ethane and tetrafluoro-dichloro-ethane. Generally speaking, the reaction medium should preferably be substantially anhydrous. Especially desirable results have been obtained in the use of anhydrous hydrofluoric acid as a reaction medium. Under the preferred conditions of reaction, it is a solvent for fluorine as well as a wide variety of organic compounds, including all of the anthraquinone compounds investigated.

In practicing the invention, it is preferable to first suspend or dissolve the organic material to be fluorinated in the liquid reaction medium and then introduce fluorine. The fluorine may be introduced as such or it may be advantageously introduced in a solution of the liquid reaction medium used to dissolve the organic material or in another suitable liquid reaction medium.

The proportion of the reactants and the reaction medium are subject to considerable variation depending largely upon the reactants, the character of the reaction and the degree of fluorination desired. Generally speaking, it is preferable to employ a relatively large volume of the reaction medium. Where a solvent medium is employed it should preferably be sufficient in amount to dissolve both the compound to be fluorinated and the fluorine. The amount of fluorine to be used may be calculated from the stoichiometric proportions theoretically required but in general, it is preferable to employ an excess of fluorine over that theoretically necessary for a desired degree of fluorination. Partial fluorination may be effected by reacting together less than one mole of fluorine per mole of the compound to be fluorinated. If desired, the fluorination may be effected in stages. Thus, a compound such as benzene may be partially fluorinated, the fluorinated product separated, and then further reacted with fluorine. This may be continued until the fluorination is complete, or until the desired fluorinated product is obtained.

The kind and proportions of catalyst employed in accordance with the invention are subject to considerable variation depending largely upon the material to be fluorinated, the reaction medium, and the conditions of reaction. In general, any catalyst which promotes the introduction of fluorine into organic molecules may be employed. The catalyst should preferably be soluble in the reaction medium. As examples of catalysts which may be employed may be mentioned: metal halides, such as, for example, cuprous chloride, silver chloride, ferric chloride, ferric bromide, antimony trifluoride, antimony pentachloride, pentavalent antimony fluoro-chlorides, silver fluoride, cuprous bromide, cuprous iodide, zinc chloride, zinc bromide, a vanadium chloride, platinic chloride, cadmium chloride, nickel chloride, cobalt chloride and manganese chloride. Elementary substances such as iodine may likewise be employed. Especially desirable results have been obtained in the use of antimony trifluoride, antimony pentachloride and iodine as catalysts. Generally speaking, if catalysts are used, they are preferably employed in small amounts, corresponding to about 0.1 to 5.0% by weight of the compound to be fluorinated.

The physical factors of temperature and pressure maintained during the reaction may vary within relatively wide limits depending largely upon the nature of the material to be fluorinated, the character of the reaction medium, and the results desired. The temperature should preferably be below that giving rise to the formation of decomposition products. Temperatures as low as −80° C. have been used with satisfactory results. In general, it is preferable to employ temperatures within the range of about −40° C to +30° C. It will be understood that these are preferred temperatures and not the minimum or maximum temperatures at which the reaction may be effected.

The pressure may be subatmospheric, superatmospheric or atmospheric. In general, the temperature and pressure should preferably be such as to maintain the reaction medium in liquid condition. Thus, at a temperature of −40° C., a pressure of at least about 150 pounds per square inch is required to maintain hexafluorethane in liquid condition; at 0° C. a pressure of about 300–400 pounds per square inch is required. Hydrogen fluoride boils at about 19.5° C. under atmospheric pressure but is a liquid at higher temperatures (below its critical temperature) under elevated pressures; e. g., at 80° C. hydrogen fluoride is a liquid under a pressure of about 85 pounds per square inch.

The desired products may be separated from the reaction mixture in any suitable manner depending largely upon their physical or chemical properties. Thus, it may be desirable to effect such separation by solvent extraction, by fractional distillation, or crystallization or by some other recognized method.

The products obtained in accordance with the process of the invention are useful for a wide variety of purposes. Some of the products have properties which render them valuable for use as solvents and reaction media. Others are useful as dyes and dye intermediates.

The invention offers a commercially practicable process for the fluorination of organic materials with elemental fluorine, a result which, insofar as is known, has not been heretofore attained. The process is further advantageous in that it may be operated smoothly and easily without substantial carbonization or decomposition of the organic materials treated.

As many apparent and widely different embodiments of this invention may be made without departing from the spirit thereof, it is to be understood that we do not limit ourselves to the foregoing examples or description except as indicated in the following claims.

We claim:

1. In a process of producing organic fluorine compounds, the step which comprises reacting fluorine with an organic material in a liquid medium which is substantially inert to fluorine.

2. In a process of producing organic fluorine compounds, the step which comprises reacting fluorine with an organic material under super atmospheric pressure in a liquid medium which is substantially inert to fluorine.

3. In a process of producing organic fluorine compounds, the step which comprises reacting fluorine with an organic material in a liquid medium which is substantially inert to fluorine in the presence of a fluorination catalyst.

4. In a process of producing organic fluorine compounds, the step which comprises reacting fluorine with an organic material in a liquid medium which is substantially inert to fluorine in the presence of a catalyst selected from the group consisting of heavy metal halides and iodine.

5. In a process of producing organic fluorine compounds, the step which comprises reacting fluorine with an organic material in a liquid medium which is substantially inert to fluorine in the presence of antimony pentachloride.

6. In a process of producing carbon compounds containing fluorine, the step which comprises reacting fluorine with a carbon compound in a liquid medium which is substantially inert under the conditions of reaction.

7. In a process of producing carbon compounds containing fluorine, the step which comprises reacting fluorine with a carbon compound in a liquid medium which is substantially inert under the conditions of reaction at a temperature below that giving rise to the formation of decomposition products.

8. In a process of producing carbon compounds containing fluorine, the step which comprises reacting fluorine with a carbon compound in liquid hydrogen fluoride.

9. In a process of producing carbon compounds containing fluorine, the step which comprises reacting fluorine with a carbon compound in a liquid medium which is substantially inert under the conditions of reaction and which is a solvent for said compound and fluorine.

10. In a process of producing carbon compounds containing fluorine, the step which comprises reacting fluorine with a hydrocarbon in a solvent medium which is substantially inert under the conditions of reaction.

11. In a process of producing carbon compounds containing fluorine, the step which comprises reacting fluorine with a halogenated hydrocarbon containing a halogen other than fluorine in a solvent medium which is substantially inert under the conditions of reaction.

12. In a process of producing carbon compounds containing fluorine, the step which comprises passing fluorine through an aliphatic chloro-hydrocarbon dissolved in a solvent medium which is substantially inert under the conditions of reaction.

13. In a process of producing carbon compounds containing fluorine, the step which comprises passing fluorine through an aliphatic chloro-hydrocarbon in hydrogen fluoride in the presence of a heavy metal halide containing a halogen other than fluorine at a temperature within the range of about −30° C. to +30° C. and under a pressure sufficient to maintain the reaction medium liquid.

14. The process of producing fluoro-chloroethanes which comprises reacting tetrachloroethane with fluorine in the presence of anhydrous hydrofluoric acid at a temperature of about −40° C.

15. In a process of producing carbon compounds containing fluorine attached to an acyclic carbon atom, the step which comprises reacting fluorine upon a carbon compound containing an acyclic carbon atom having attached thereto at least one halogen other than fluorine, in the presence of a liquid medium which is substantially inert to fluorine under the conditions of reaction.

16. In a process of producing carbon compounds containing fluorine attached to an acyclic carbon atom, the step which comprises reacting with fluorine upon a carbon compound containing an acyclic carbon atom having attached thereto at least one halogen other than fluorine, in the presence of substantially anhydrous liquid hydrogen fluoride.

17. In a process of replacing hydrogen by fluorine in a carbon compound, the step which comprises reacting with fluorine upon an organic compound containing a carbon-hydrogen linkage, in the presence of a liquid medium which is substantially inert to fluorine under the conditions of reaction.

18. In a process of replacing hydrogen by fluorine in a carbon compound, the step which comprises reacting with fluorine upon an organic compound containing a carbon-hydrogen linkage, in the presence of substantially anhydrous liquid hydrogen fluoride.

19. In a process of producing cyclic carbon compounds containing nuclear substituted fluorine, the step which comprises reacting with fluorine upon a cyclic organic compound in which at least one of the carbon atoms of the ring nucleus is attached to at least one atom belonging to the group consisting of hydrogen and halogen atoms having an atomic weight greater than fluorine, in the presence of a liquid medium which is substantially inert to fluorine under the conditions of reaction.

20. In a process of producing cyclic carbon compounds containing nuclear substituted fluorine, the step which comprises reacting with fluorine upon a cyclic organic compound in which at least one of the carbon atoms of the ring nucleus is attached to at least one atom belonging to the group consisting of hydrogen and halogen atoms having an atomic weight greater than fluorine, in the presence of substantially anhydrous liquid hydrogen fluoride.

21. In a process of producing carbon compounds containing fluorine, the step which comprises reacting fluorine with a halogenated hydrocarbon in which the halogen atoms have an atomic weight greater than fluorine, in the presence of substantially anhydrous liquid hydrogen fluoride.

22. In a process of producing carbon compounds containing fluorine, the step which comprises reacting fluorine with an aliphatic halogenated hydrocarbon in which the halogen atoms have an atomic weight greater than fluorine, in the presence of substantially anhydrous liquid hydrogen fluoride.

23. The process of producing fluoro-haloethanes which comprises reacting a halogenated ethane containing more than three halogen atoms which have an atomic weight greater than fluorine, with fluorine in the presence of substantially anhydrous liquid hydrogen fluoride.

24. In a process of producing vat compounds containing fluorine, the step which comprises reacting fluorine with a vat compound in a liquid medium which is substantially inert to fluorine under the conditions of reaction.

25. In a process of producing vat compounds containing fluorine, the step which comprises reacting a vat compound with fluorine, in the presence of substantially anhydrous liquid hydrogen fluoride.

26. In a process of producing vat compounds of the anthraquinone series containing fluorine, the step which comprises reacting fluorine with a vat compound of the anthraquinone series, in the presence of substantially anhydrous liquid hydrogen fluoride.

27. In a process of producing organic fluorine compounds, the step which comprises reacting fluorine with an organic material in a liquid, chemically combined fluorine-containing diluent which is inert to fluorine.

28. In a process of producing organic fluorine compounds, the step which comprises reacting fluorine with a halogenated hydrocarbon containing at least one halogen atom other than fluorine in a liquid, chemically combined fluorine-containing diluent which is inert to fluorine.

29. In a process of producing fluorinated lower aliphatic hydrocarbons, the step which comprises reacting fluorine with a lower halogenated aliphatic hydrocarbon containing at least one halogen atom other than fluorine in a liquid, chemically combined fluorine-containing diluent which is inert to fluorine.

30. In a process of producing organic fluorine compounds, the step which comprises reacting fluorine with a compound selected from the group consisting of hydrocarbons and halogenated hydrocarbons containing at least one halogen atom other than fluorine, in the presence of a liquid, chemically combined fluorine-containing diluent which is inert to fluorine.

31. In a process of producing organic fluorine compounds, the step which comprises reacting fluorine with a compound selected from the group consisting of hydrocarbons and halogenated hydrocarbons containing at least one halogen atom other than fluorine, in the presence of substantially anhydrous hydrogen fluoride.

WILLIAM S. CALCOTT.
ANTHONY F. BENNING.

CERTIFICATE OF CORRECTION.

Patent No. 2,013,030.　　　　　　　　　　　　　　　　　　　　　September 3, 1935.

WILLIAM STANSFIELD CALCOTT, ET AL.

It is hereby certified that error appears in the printed specification of the above numbered patent requiring correction as follows: Page 1, second column, lines 18, 31 and 44, for "70°" read -70°; same page and column, lines 19, 32 and 44, for "80°" read -80°; and that the said Letters Patent should be read with these corrections therein that the same may conform to the record of the case in the Patent Office.

Signed and sealed this 26th day of November, A. D. 1935.

(Seal)

Leslie Frazer
Acting Commissioner of Patents.